United States Patent
Rheaume et al.

(10) Patent No.: US 11,679,893 B2
(45) Date of Patent: Jun. 20, 2023

(54) PRESSURIZED INERTING SYSTEM

(71) Applicant: Hamilton Sundstrand Corporation, Charlotte, NC (US)

(72) Inventors: Jonathan Rheaume, West Hartford, CT (US); Sean C. Emerson, Broad Brook, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 965 days.

(21) Appl. No.: 16/149,736

(22) Filed: Oct. 2, 2018

(65) Prior Publication Data
US 2020/0102087 A1    Apr. 2, 2020

(51) Int. Cl.
  *B64D 37/32*    (2006.01)
  *B01D 53/32*    (2006.01)
  *B01D 53/26*    (2006.01)

(52) U.S. Cl.
  CPC ........... *B64D 37/32* (2013.01); *B01D 53/265* (2013.01); *B01D 53/326* (2013.01)

(58) Field of Classification Search
  CPC ..... B64D 37/32; B01D 53/265; B01D 53/326
  See application file for complete search history.

(56) References Cited

U.S. PATENT DOCUMENTS

| | | | |
|---|---|---|---|
| 3,847,298 A | 11/1974 | Hamilton | |
| 4,969,398 A | 11/1990 | Lundwall | |
| 7,905,259 B2 | 3/2011 | Johnson et al. | |
| 8,813,860 B2 | 8/2014 | Bleil et al. | |
| 9,102,416 B1 | 8/2015 | Cutler | |
| 9,130,204 B2 | 9/2015 | Hoffjann et al. | |
| 9,211,957 B2 | 12/2015 | Lam et al. | |
| 9,623,981 B2 | 4/2017 | Darling et al. | |
| 10,150,571 B2 | 12/2018 | Cordatos et al. | |
| 10,337,111 B2 | 7/2019 | Tew et al. | |
| 2017/0141421 A1* | 5/2017 | Sundaram | H01M 8/04097 |
| 2017/0167036 A1 | 6/2017 | Tew et al. | |
| 2017/0331131 A1 | 11/2017 | Rheaume | |
| 2018/0050300 A1 | 2/2018 | Rheaume et al. | |
| 2018/0140996 A1* | 5/2018 | Rheaume | B01D 53/326 |
| 2018/0148188 A1 | 5/2018 | Surawski | |
| 2018/0148189 A1 | 5/2018 | Surawski | |
| 2018/0148190 A1 | 5/2018 | Surawski | |
| 2018/0148191 A1 | 5/2018 | Smith et al. | |
| 2018/0155047 A1 | 6/2018 | Surawski | |
| 2018/0155048 A1 | 6/2018 | Surawski | |
| 2018/0155049 A1 | 6/2018 | Smith et al. | |
| 2018/0155050 A1 | 6/2018 | Surawski et al. | |
| 2019/0388832 A1 | 12/2019 | Rheaume | |
| 2020/0009412 A1 | 1/2020 | Rheaume | |
| 2020/0171429 A1* | 6/2020 | Giroud | B01D 53/268 |
| 2022/0073210 A1 | 3/2022 | Rheaume et al. | |

FOREIGN PATENT DOCUMENTS

| | | |
|---|---|---|
| EP | 2927130 A1 | 10/2015 |
| EP | 3181457 A1 | 6/2017 |
| EP | 3284676 A1 | 2/2018 |
| WO | 2007054316 A1 | 5/2007 |

OTHER PUBLICATIONS

European Search Report for European Application No. 19200509.8, Application Filing Date Sep. 30, 2019; dated Mar. 18, 2020; 9 pages.
Bundesministerium fuer Bildung und Forschung (Federal Ministry of Education and Research) Multifunktionale Brennstoffzelle (Multifunctional Fuel Cell) (3 pages).
Keim et al. "Multifunctional fuel cell system in an aircraft environment: An investigation focusing on fuel tank inerting and water generation" Aerospace Science and Technology 29 (2013) 330-338.
Oehme "Modellierung und experimentelle Untersuchung der thermischen Abluftentfeuchtung multifunktionaler Brennstoffzellensysteme" Dissertation (2015), 145 pages.
Oehme, et at. "Untersuchungen an Einem Wärmeübertrager Unter Entfeuchtungsbedingungen Für Brennstoffzellen An Bord Von Passagierflugzeugen" Deutscher Luft-und Raumfahrtkongress 2012, 10 pages.
European Official Action for Application No. 19200509.8, dated Feb. 20, 2023, 7 pages.

* cited by examiner

*Primary Examiner* — Yong L Chu
(74) *Attorney, Agent, or Firm* — Cantor Colburn LLP

(57) ABSTRACT

A system and method for providing dried inert gas to a protected space is disclosed.

18 Claims, 4 Drawing Sheets

PRESSURIZED INERTING SYSTEM

BACKGROUND

The subject matter disclosed herein generally relates to systems for providing inert gas, and more particularly to inerting systems for aircraft fuel tanks.

It is recognized that fuel vapors within fuel tanks become combustible or explosive in the presence of oxygen. An inerting system decreases the probability of combustion or explosion of flammable materials in a fuel tank by maintaining a chemically non-reactive or inert gas, such as oxygen-depleted air, in the fuel tank vapor space, also known as ullage.

It is known in the art to equip aircraft with onboard inert gas generating systems, which supply oxygen-depleted air to the vapor space (i.e., ullage) within the fuel tank. The oxygen-depleted air has a substantially reduced oxygen content that reduces or eliminates oxidizing conditions within the fuel tank. Some onboard inert gas generating systems generate humid oxygen depleted air. Methods and apparatus to reduce the water content of the humid oxygen-depleted air are needed.

BRIEF DESCRIPTION

A system for providing inert gas to a protected space, comprising a pressurized air flow path in operative fluid communication with a boost compressor and a chemical inert gas generator; and an inert gas flow path in operative fluid communication with the chemical inert gas generator, a condenser and the protected space, wherein the condenser operates at a pressure greater than or equal to 2 atmospheres absolute pressure and is located between the chemical inert gas generator and the protected space along the inert gas flow path.

In any one or combination of the foregoing embodiments, the chemical inert gas generator may include a catalytic oxidation unit. The catalytic oxidation unit may operate at a temperature greater than 150° C.

In any one or combination of the foregoing embodiments, the chemical inert gas generator may include a proton exchange membrane electrochemical device. The pressurized air flow path may further include a heat exchanger. In any one or combination of the foregoing embodiments, the pressurized air flow path includes a heat exchanger before the boost compressor and an additional heat exchanger after the boost compressor.

In any one or combination of the foregoing embodiments, the chemical inert gas generator may include a solid oxide electrochemical device. The solid oxide electrochemical device may operate at a temperature greater than 700° C. The inert gas flow path may further include a heat exchanger between the chemical inert gas generator and the compressor.

In any one or combination of the foregoing embodiments, the pressurized air flow path includes a bypass valve in parallel with the boost compressor.

Also disclosed is a method for providing inert gas to a protected space comprising providing air having a pressure greater than or equal to 2 atmospheres absolute pressure to a chemical inert gas generator; producing an inert gas in the chemical inert gas generator; providing the inert gas to a condenser at a pressure greater than or equal to 2 atmospheres absolute pressure; reducing the water content of the inert gas in the condenser; and providing the dried inert gas to a protected space.

In any one or combination of the foregoing embodiments, the chemical inert gas generator may include a catalytic oxidation unit. The catalytic oxidation unit may operate at a temperature greater than 150° C.

In any one or combination of the foregoing embodiments, the chemical inert gas generator includes a proton exchange membrane electrochemical device. The proton exchange membrane electrochemical device may operate at a temperature less than the boiling point of water.

In any one or combination of the foregoing embodiments, the chemical inert gas generator comprises a solid oxide electrochemical device. The chemical inert gas generator may operate at a temperature greater than 700° C.

BRIEF DESCRIPTION OF THE DRAWINGS

The following descriptions should not be considered limiting in any way. With reference to the accompanying drawings in which like elements are numbered alike.

DETAILED DESCRIPTION

A detailed description of one or more embodiments of the disclosed apparatus and method are presented herein by way of exemplification and not limitation with reference to the Figures.

Figure 1A:
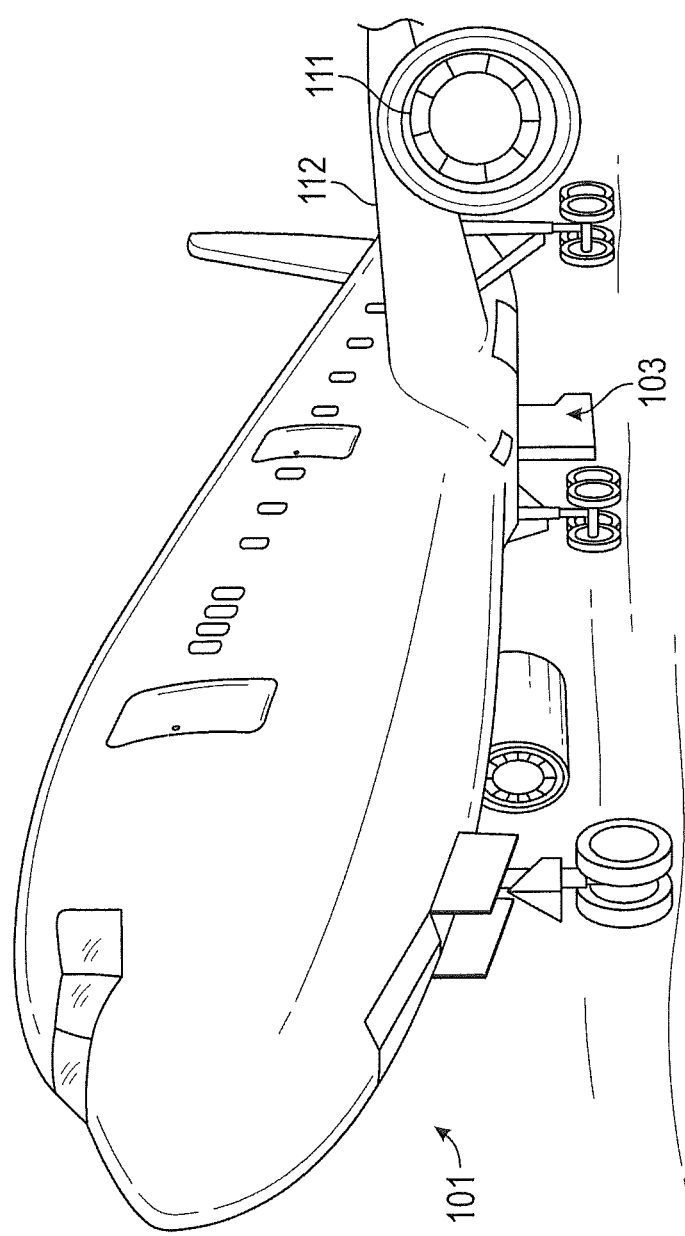
FIG. 1A is a schematic illustration of an aircraft that can incorporate various embodiments of the present disclosure.
Figure 1B:
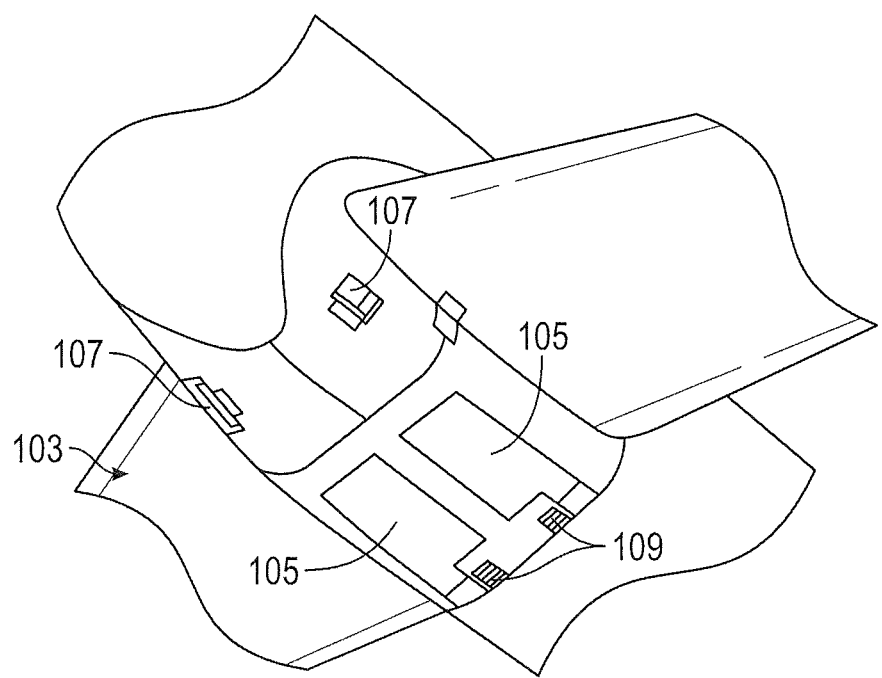
FIG. 1B is a schematic illustration of a bay section of the aircraft of FIG. 1A.

As shown in FIGS. 1A-1B, an aircraft includes an aircraft body 101, which can include one or more bays 103 beneath a center wing box. The bay 103 can contain and/or support one or more components of the aircraft 101. For example, in some configurations, the aircraft can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft, air that is external to the aircraft can flow into one or more ram air inlets 107. The outside air may then be directed to various system components (e.g., environmental conditioning system (ECS) heat exchangers) within the aircraft. Some air may be exhausted through one or more ram air exhaust outlets 109.

Also shown in FIG. 1A, the aircraft includes one or more engines 111. The engines 111 are typically mounted on the wings 112 of the aircraft and are connected to fuel tanks (not shown) in the wings, but may be located at other locations depending on the specific aircraft configuration. In some aircraft configurations, air can be bled from the engines' 111 compressor stages and supplied to environmental control systems and/or fuel inerting systems, as will be appreciated by those of skill in the art.

The fuel inerting system treats the air provided to the system to form oxygen-depleted air (ODA). The ODA is provided to a protected space such as a fuel tank. There are several known methods of producing ODA on board an aircraft which can produce humid ODA. These involve chemical reactions such as those in the catalytic oxidation of fuel as well as in the electrochemical reduction of oxygen at the cathode of an electrochemical cell that utilizes proton exchange or oxygen anion transport through the electrolyte. Catalytic oxidation of fuel is described in U.S. Patent Publication No. 2018/0127110.

Figure 2:
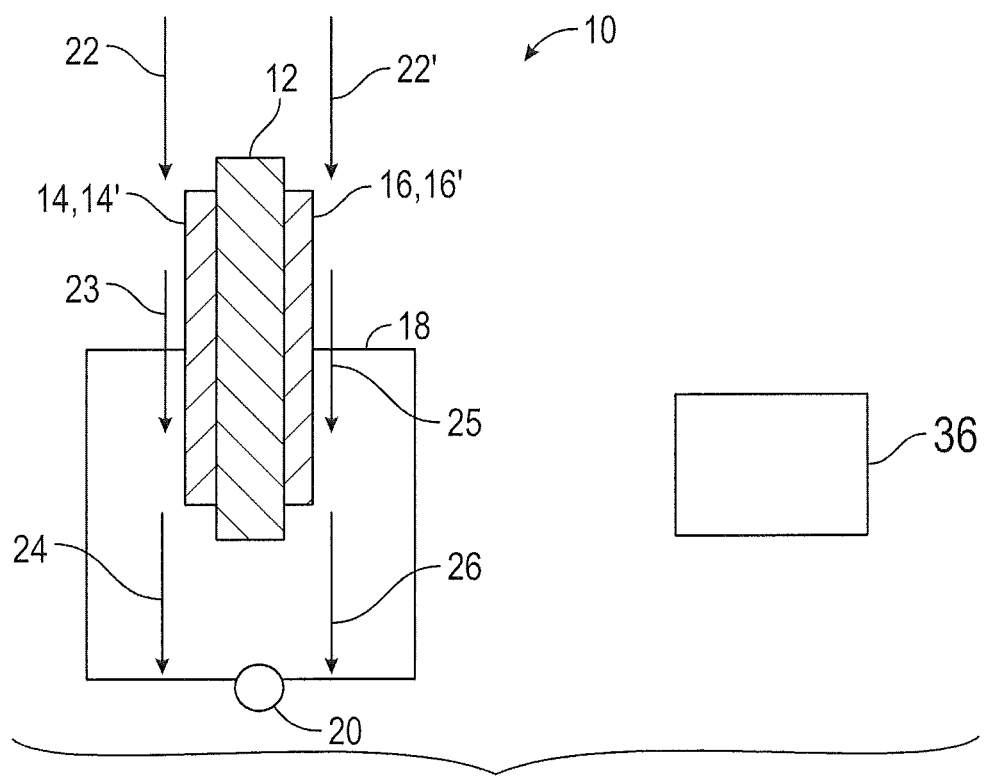
FIG. 2 is a schematic illustration of a chemical inert gas generator for an oxygen depletion system.

Referring now to FIG. 2, a chemical inert gas generator comprising an electrochemical cell is schematically depicted. The chemical inert gas generator 10 comprises a separator 12 that includes an ion transfer medium. As shown in FIG. 2, the separator 12 has a cathode 14 disposed on one side and an anode 16 disposed on the other side. Cathode 14 and anode 16 can be fabricated from catalytic materials suitable for performing the needed electrochemical reaction (e.g., the oxygen-reduction reaction at the cathode and an oxidation reaction at the anode). Exemplary catalytic materials include, but are not limited to, nickel, platinum, palladium, rhodium, carbon, gold, tantalum, titanium, tungsten, ruthenium, iridium, osmium, zirconium, alloys thereof, and the like, as well as combinations of the foregoing materials. Some organic materials and metal oxides can also be used as catalysts, as contrasted to electrochemical cells utilizing proton exchange membranes where the conditions preclude the use of metal oxide catalysts. Examples of metal oxide catalysts include, but are not limited to ruthenium oxides, iridium oxides or transition-metal oxides, generically depicted as $M_xO_y$, where x and y are positive numbers capable of forming a stable catalytic metal oxide such as $Co_3O_4$. Cathode 14 and anode 16, including catalyst 14' and catalyst 16', are positioned adjacent to, and preferably in contact with the separator 12 and can be porous metal layers deposited (e.g., by vapor deposition) onto the separator 12, or can have structures comprising discrete catalytic particles adsorbed onto a porous substrate that is attached to the separator 12. Alternatively, the catalyst particles can be deposited on high surface area powder materials (e.g., graphite or porous carbons or metal-oxide particles) and then these supported catalysts may be deposited directly onto the separator 12 or onto a porous substrate that is attached to the separator 12. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of the separator 12. In either case, the cathode and anode layers 14 and 16 may also include a binder material, such as a polymer, especially one that also acts as an ionic conductor such as anion-conducting ionomers. In some embodiments, the cathode and anode layers 14 and 16 can be cast from an "ink," which is a suspension of supported (or unsupported) catalyst, binder (e.g., ionomer), and a solvent that can be in a solution (e.g., in water or a mixture of alcohol(s) and water) using printing processes such as screen printing or ink jet printing.

The cathode 14 and anode 16 can be controllably electrically connected by electrical circuit 18 to a controllable electric power system 20, which can include a power source (e.g., DC power rectified from AC power produced by a generator powered by a gas turbine engine used for propulsion or by an auxiliary power unit) and optionally a power sink. In some embodiments, the electric power system 20 can optionally include a connection to an electric power sink (e.g., one or more electricity-consuming systems or components onboard the vehicle) with appropriate switching, power conditioning, or power bus(es) for such on-board electricity-consuming systems or components, for optional operation in an alternative fuel cell mode. Inert gas systems with electrochemical cells that can alternatively operate to produce oxygen-depleted air in a fuel-consuming power production (e.g., fuel cell) mode or a power consumption mode (e.g., electrolyzer cell) are disclosed in US patent application publication no. 2017/0331131 A1, the disclosure of which is incorporated herein by reference in its entirety.

With continued reference to FIG. 2, a cathode supply fluid flow path 22 directs gas from a pressurized air source (not shown) into contact with the cathode 14. Oxygen is electrochemically depleted from air along the cathode fluid flow path 23, and is discharged as oxygen-depleted air (ODA) to an inert gas flow path 24 for delivery to an on-board fuel tank (not shown), or to a vehicle fire suppression system associated with an enclosed space (not shown), or controllably to either or both of a vehicle fuel tank or an on-board fire suppression system. An anode fluid flow path 25 is configured to controllably receive an anode supply fluid from an anode supply fluid flow path 22'. The anode fluid flow path 25 can include water if the electrochemical cell is configured for proton transfer across the separator 12 (e.g., a proton exchange membrane (PEM) electrolyte or phosphoric acid electrolyte). If the electrochemical cell is configured for oxygen anion transfer across the separator 12 (e.g., a solid oxide electrolyte), it can optionally be configured to receive air along the anode fluid flow path 25. Although not stoichiometrically required by the electrochemical reactions of the solid oxide electrochemical cell, airflow to the anode during power-consumption mode can have the technical effects of diluting the potentially hazardous pure heated oxygen at the anode, and providing thermal regulation to the cell. If the system is configured for alternative operation in a fuel cell mode, the anode fluid flow path 25 can be configured to controllably also receive fuel (e.g., hydrogen for a proton-transfer cell, hydrogen or hydrocarbon reformate for a solid oxide cell). Anode exhaust 26 can, depending on the type of cell and the anode exhaust content, be exhausted or subjected to further processing. Control of fluid flow along these flow paths can be provided through conduits and valves (not shown), which can be controlled by a controller 36.

In some embodiments, the chemical inert gas generator 10 can operate utilizing the transfer of protons across the separator 12. Exemplary materials from which the electrochemical proton transfer electrolytes can be fabricated include proton-conducting ionomers and ion-exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION™ resins (commercially available from E. I. du Pont de Nemours and Company, Wilmington, Del.). Alternatively, instead of an ion-exchange membrane, the separator 12 can be comprised of a liquid electrolyte, such as sulfuric or phosphoric acid, which may preferentially be absorbed in a porous-solid matrix material such as a layer of silicon carbide or a polymer than can absorb the liquid electrolyte, such as poly(benzoxazole). These types of alternative "membrane electrolytes" are well known and have been used in other electrochemical cells, such as phosphoric-acid fuel cells.

During operation of a proton transfer electrochemical cell in the electrolyzer mode, water at the anode undergoes an electrolysis reaction according to the formula $$H_2O \rightarrow \tfrac{1}{2}O_2 + 2H^+ + 2e^- \tag{1}$$

The electrons produced by this reaction are drawn from electrical circuit 18 powered by electric power source 20 connecting the positively charged anode 16 with the cathode 14. The hydrogen ions (i.e., protons) produced by this reaction migrate across the separator 12, where they react at the cathode 14 with oxygen in the cathode flow path 23 to produce water according to the formula $$\tfrac{1}{2}O_2 + 2H^+ + 2e^- \rightarrow H_2O \qquad (2)$$

Removal of oxygen from cathode flow path 23 produces oxygen-depleted air exiting the region of the cathode 14. The oxygen evolved at the anode 16 by the reaction of formula (1) is discharged as oxygen or an oxygen-enriched air stream as anode exhaust 26.

During operation of a proton transfer electrochemical cell in a fuel cell mode, fuel (e.g., hydrogen) at the anode undergoes an electrochemical oxidation according to the formula $$H_2 \rightarrow 2H^+ + 2e^- \qquad (3)$$

The electrons produced by this reaction flow through electrical circuit 18 to provide electric power to an electric power sink (not shown). The hydrogen ions (i.e., protons) produced by this reaction migrate across the separator 12, where they react at the cathode 14 with oxygen in the cathode flow path 23 to produce water according to formula (2).

$$\tfrac{1}{2}O_2 + 2H^+ + 2e^- \rightarrow H_2O \qquad (2)$$

Removal of oxygen from cathode flow path 23 produces oxygen-depleted air exiting the region of the cathode 14.

As mentioned above, the electrolysis reaction occurring at the positively charged anode 16 requires water, and the ionic polymers used for a PEM electrolyte perform more effectively in the presence of water. Accordingly, in some embodiments, a PEM membrane electrolyte is saturated with water or water vapor. Although the reactions (1) and (2) are stoichiometrically balanced with respect to water so that there is no net consumption of water, in practice moisture will be removed by ODA 24 (either entrained or evaporated into the oxygen-depleted air) as it exits from the region of cathode 14. Accordingly, in some exemplary embodiments, water is circulated past the anode 16 along an anode fluid flow path (and optionally also past the cathode 14). Such water circulation can also provide cooling for the electrochemical cells. In some exemplary embodiments, water can be provided at the anode from humidity in air along an anode fluid flow path in fluid communication with the anode. In other embodiments, the water produced at cathode 14 can be captured and recycled to anode 16 (not shown). It should also be noted that, although the embodiments are contemplated where a single electrochemical cell is employed, in practice multiple electrochemical cells will be electrically connected in series with fluid flow to the multiple cathode and anode flow paths routed through manifold assemblies.

In some embodiments, the chemical inert gas generator 10 can operate utilizing the transfer of oxygen anions across the separator 12. Exemplary materials from which the electrochemical oxygen anion-transporting electrolytes can be fabricated include solid oxides such as yttria-stabilized zirconia and/or ceria doped with rare earth metals. These types of materials are well known and have been used in solid oxide fuel cells (SOFC).

During operation of an oxygen anion transfer electrochemical cell in a power consuming (e.g., electrolyzer) mode, oxygen at the cathode undergoes an electrochemical reduction reaction according to the formula $$\tfrac{1}{2}O_2 + 2e^- \rightarrow O^= \qquad (4)$$

The electrons consumed by this reaction are drawn from electrical circuit 18 powered by electric power source 20 connecting the positively charged anode 16 with the cathode 14. The oxygen anions produced by this reaction migrate across the separator 12, where they undergo an electrochemical oxidation reaction at the anode 14 according to the formula $$O^= \rightarrow \tfrac{1}{2}O_2 + 2e^- \qquad (5)$$

Removal of oxygen from cathode flow path 24 produces oxygen-depleted air exiting the region of the cathode 14. The oxygen produced at the anode 16 by the reaction of formula (5) is discharged as oxygen or an oxygen-enriched air stream as anode exhaust 26.

During operation of an oxygen ion transfer electrochemical cell in a fuel cell mode, oxygen at the cathode undergoes an electrochemical reduction reaction according to the formula $$\tfrac{1}{2}O_2 + 2e^- \rightarrow O^= \qquad (4)$$

The electrons consumed by this reaction are drawn from electrons liberated at the anode, which flow through electrical circuit 18 to provide electric power to electric power sink (not shown). The oxygen anions produced by this reaction migrate across the separator 12, where they react with fuel such as hydrogen at the anode according to the formula $$H_2 + O^= \rightarrow H_2O + 2e^- \qquad (6)$$

Carbon monoxide (e.g., contained in fuel reformate) can also serve as fuel in solid oxide electrochemical cells. In this case, the oxygen anions produced at the cathode according to formula (4) migrate across the separator 12 where they react with carbon monoxide at the anode according to the formula $$CO + O^= \rightarrow CO_2 + 2e^- \qquad (7)$$

Removal of oxygen from cathode flow path 24 produces oxygen-depleted air exiting the region of the cathode 14. The steam and carbon dioxide produced at the anode 16 by the reactions of formulas (6) and (7) respectively is discharged along with unreacted fuel as anode exhaust 26. The unreacted fuel that exits anode 16 via anode exhaust flow path 26 can be recycled to fuel flow path 32 using an ejector or blower (not shown). It can also be fed to a fuel processing unit wherein the steam and carbon dioxide contribute to reforming.

In an electrochemical system, a plurality of electrochemical cells are typically arranged in series in a stack via interconnects or bipolar plates as known to those skilled in the art. In FIG. 2, for simplicity a single anode or cathode can represent the plurality anodes and cathodes of an electrochemical stack. A stack of cells can further be arranged in series, or several stacks of cells can be arranged in parallel according to power availability and requirements.

The ODA produced by each type of chemical inert gas generator needs to be dried to prevent the formation of ice in the protected space such as fuel tanks. A heat exchanger, water separator, or combination thereof can be used to condense and remove water from the ODA. In order to efficiently remove sufficient water from the ODA using a heat exchanger, the system must be pressurized to elevate the dew point above freezing. A boost compressor is required to consistently achieve the desired pressure at the desired point in the system because at some times during a flight, such as during descent or idle, there is insufficient pressure in the source pressurized air. Exemplary pressurized air sources include bleed air from an engine compressor, a separate compressor which may provide pressurized air to the aircraft cabin, or an auxiliary compressor which provides pressurized air to auxiliary systems.

For example, in some embodiments such as on-board an aircraft during flight, the condensation temperature at which a desired amount of water can be removed from the ODA can actually be below 0° C. at ambient pressure, and since it must be operated above 0° C. to avoid icing, an insufficient amount of water may be removed. However, increasing the pressure of the water-containing ODA can increase the dew point to a temperature above 0° C. for effective removal of water. In another example, in which the system is operated on the ground on a hot day, the temperature of available outside cooling air on the heat absorption side of a heat exchanger condenser may not be cold enough to condense a desired amount of water. However, increasing the pressure of the water-containing ODA can shift the equilibrium toward condensation of greater amounts of water, and in some embodiments the pressure at the condenser can be kept at a level for the dew point to be greater than ambient temperature to provide a maximum amount of water removal. In some embodiments, pressure can be greater than or equal to 2 atmospheres (atm) absolute pressure. In some embodiments, pressure can be greater than or equal to 2 atm absolute pressure, or, greater than or equal to 2.5 atm absolute pressure, or, greater than or equal to 2.7 atm absolute pressure. In some embodiments, pressure can be 3 atm absolute pressure. In some embodiments, pressure can be greater than or equal to 3 atm absolute pressure. In some embodiments, pressure can 2-3 atm absolute pressure.

The boost compressor has a bypass flow path in parallel with the compressor that has a valve. The valve can be closed to prevent wind milling of the boost compressor rotor when not in use.

The boost compressor is separate from the engine compressor and may be electrically driven, hydraulically driven, mechanically driven from an accessory gearbox on the engine, or pneumatically driven using process air from an engine or auxiliary power unit. The boost compressor is controlled by a controller. The controller can manage the boost compressor based on information provided by a sensor or sensors as part of the system or the controller can manage the boost compressor on an operation schedule. In addition, the controller can manage the ram air flow to the inerting system.

Figure 3:
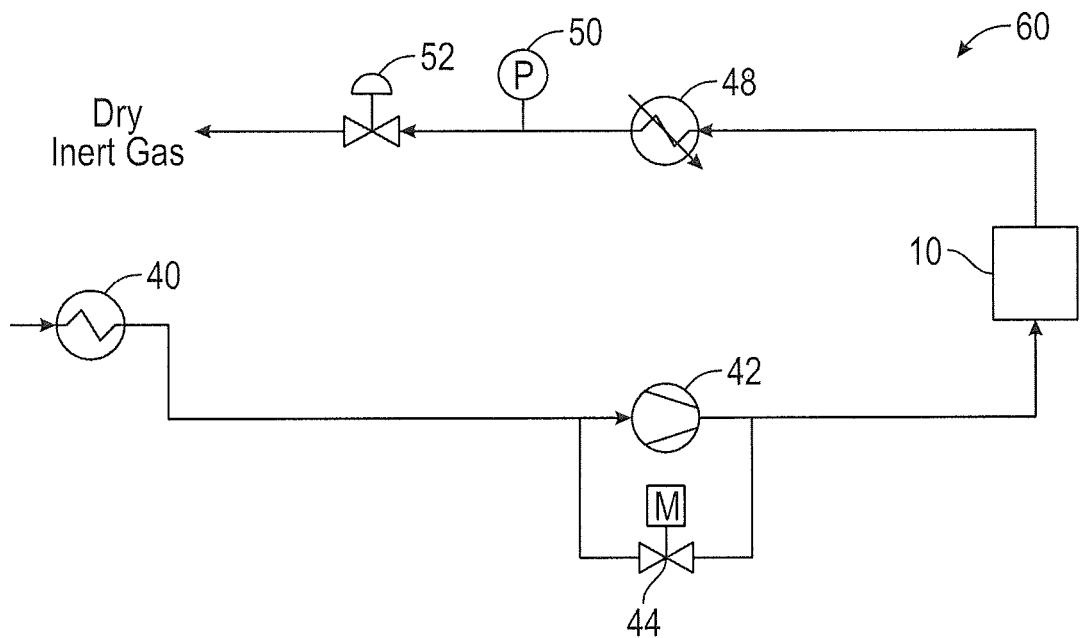
FIGS. 3-5 are schematic illustrations of chemical inert gas generation systems.

The location of the boost compressor is generally between the source of pressurized air and the chemical inert gas generator and may be dependent on the method of producing the ODA and the availability of power sources. FIG. 3 shows a system and method for producing ODA with a reduced water content (also referred to as dry ODA) using a catalytic oxidation inert gas generator. Source pressurized air is optionally sent to a precooler 40 and then sent by a pressurized air flow path to boost compressor 42 equipped with a bypass valve 44. The boost compressor is controlled by the controller 60. If the source pressurized air has sufficient pressure for the system, then the boost compressor is bypassed. If the source pressurized air does not have sufficient pressure, then the boost compressor increases the pressure to the desired level as described above. The pressurized air is introduced to the chemical inert gas generator 10. In the embodiment shown in FIG. 3, the chemical inert gas generator is a catalytic oxidation unit. The catalytic oxidation unit may have an inlet temperature greater than 150 degrees Celsius. The chemical inert gas generator discharges humid ODA (via inert gas flow path) which is introduced to a condenser 48 to remove water. Cooling air can be provided to the condenser 48 from ram air or from any suitable heat sink, for example, air conditioned by an air cycle cooling system, or air conditioned by a vapor compression cycle cooling system, or cabin outflow air. In some embodiments, in lieu of cooling air, a fluid such as chilled liquid ethylene glycol may serve as the heat sink. The cooling source is controlled by controller 60. The controller 60 manages the cooling air temperature to prevent freezing the condenser 48. The dry ODA exiting the condenser 48 may pass through a sensor 50 and a pressure regulator 52 prior to being introduced to a protected space such as a fuel tank. Sensor 50 may be used to detect temperature, pressure, chemical composition or variations thereof and is in communication with controller 60. Pressure regulator 52 may function in response to controller 60 based, at least in part, on readings from sensor 50. In an exemplary embodiment, the pressure regulator is set to a constant pressure for the entire mission. In another exemplary embodiment, the pressure regulator adjusts system pressure according to an operation schedule.

Figure 4:
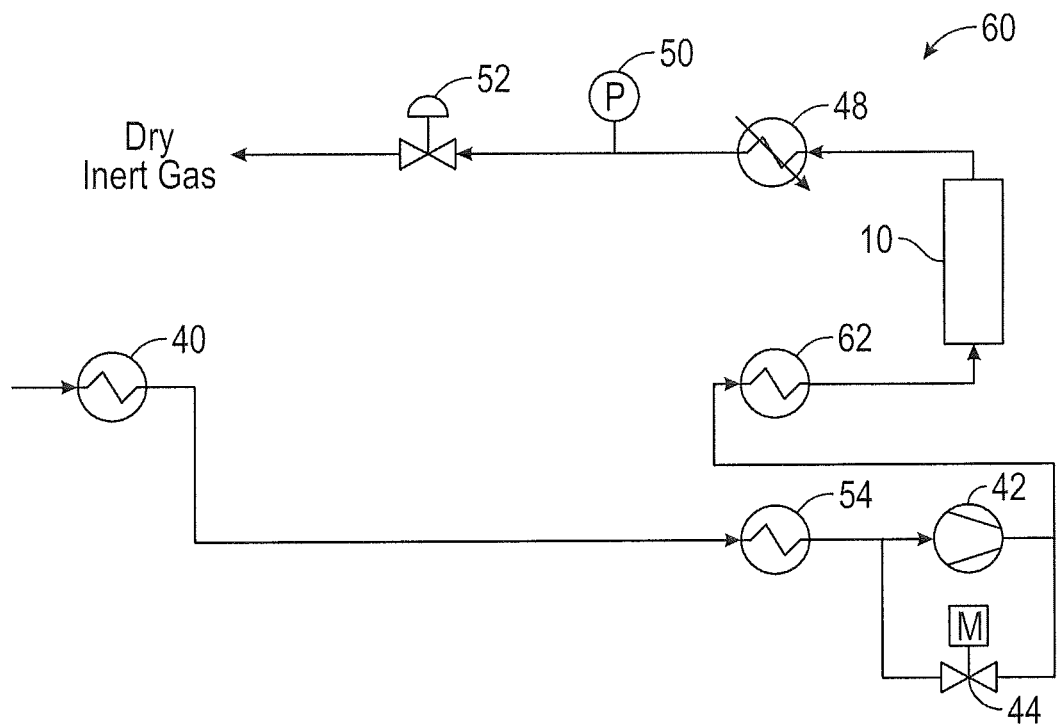

FIG. 4 shows a system in which the chemical inert gas generator 10 comprises a proton exchange membrane. Source pressurized air is sent to a precooler 40 and then sent a heat exchanger 54 by a pressurized air flow path prior to boost compressor 42 equipped with a bypass valve 44. The heat exchanger uses ram air as a cold sink and is controlled by the controller 60. After the compressor there is a second heat exchanger 62. The second heat exchanger 62 is used to provide air having a temperature less than the boiling point of water to the electrochemical cell 10. The boost compressor is also controlled by the controller 60. If the source pressurized air has sufficient pressure for the system, then the boost compressor is bypassed. If the source pressurized air does not have sufficient pressure, then the boost compressor increases the pressure to the desired level. The pressurized air is introduced to the electrochemical cell having a proton exchange membrane. The electrochemical cell discharges humid ODA which is introduced to a condenser 48 to remove water. Cooling air can be provided to the condenser 48 from ram air or any suitable heat sink as described above. The cooling air source is controlled by controller 60. The controller 60 manages the cooling air temperature to prevent freezing the condenser 48. The dry ODA exiting the condenser 48 may pass through a sensor 50 and a pressure regulator 52 prior to being introduced to a protected space such as a fuel tank. Sensor 50 may be used to detect temperature, mass flow, pressure or a combination thereof and is in communication with controller 60. Pressure regulator 52 may function in response to controller 60 based, at least in part, on readings from sensor 50 or according to an operation schedule.

Figure 5:
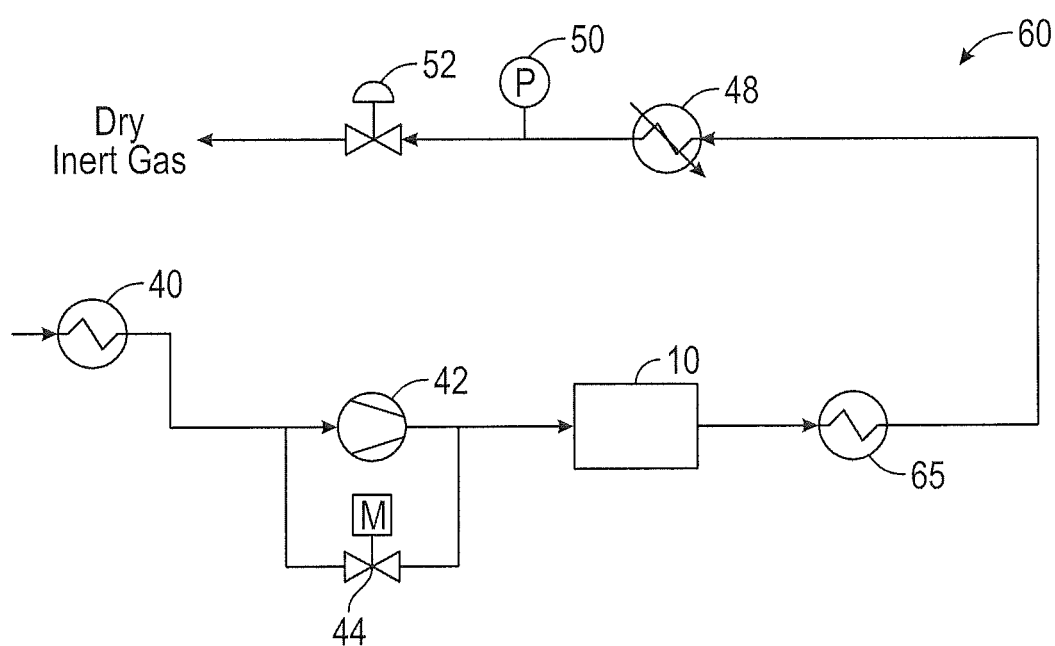

FIG. 5 shows a system and method for producing dry ODA using an electrochemical cell comprising a solid oxide electrolyte. Source pressurized air is sent to a precooler 40 and then sent by a pressurized air flow path to boost compressor 42 equipped with a bypass valve 44. The boost compressor is controlled by the controller 60. If the source pressurized air has sufficient pressure for the system, then the boost compressor is bypassed. If the source pressurized air does not have sufficient pressure, then the boost compressor increases the pressure to the desired level as described above. The pressurized air is optionally preheated (not shown) prior to being introduced to the chemical inert gas generator 10 comprising a solid oxide unit. Electrochemical cells comprising solid oxide units may operate at temperatures greater than 700 degrees Celsius. The ODA leaving the cathode is sent to a heat exchanger 65 to recover heat which can be recycled to heat the air entering the solid oxide unit if needed. The ODA is then introduced to a condenser 48 to remove water. Cooling air can be provided to the condenser 48 from ram air or from any suitable heat sink as described above. The cooling source is controlled by controller 60. The controller 60 manages the cooling air temperature to prevent freezing the condenser 48. The dry ODA exiting the condenser 48 may pass through a sensor 50 and a pressure regulator 52 prior to being introduced to a protected space such as a fuel tank. Sensor 50 may be used to detect temperature, mass flow rate, and pressure and is in communication with controller 60. Pressure regulator 52 may function in response to controller 60 based, at least in part, on readings from sensor 20 or according to an operation schedule.

In addition to supplying ODA to ullage of the fuel tank(s) onboard the aircraft, the ODA may be also be used for other functions, such as serving as a fire-suppression agent. For example, cargo compartments onboard aircraft typically have fire-suppression systems that include a dedicated gas-distribution system comprising tubes routed to nozzles in the cargo bay to deploy fire-suppression agents in the event of a fire. A variety of fire-suppression agents may be deployed depending on the type and extent of the fire. In the case of a fire, all or some of the ODA could be routed to one or more of these fire-suppression distribution systems. The ODA could also be used to enable inerting coverage over extended periods, which may be in addition to, or in lieu of, dedicated low-rate discharge inerting systems in the cargo bay(s).

During operation, the system can be controlled by controller 60 to set fluid flow rates to produce varying amounts of ODA in response to system parameters. Such system parameters can include, but are not limited to mission phase, temperature of the fuel in protected space(s), oxygen content of the fuel in the case of a fuel tank protected space, oxygen content of gas in the protected space(s) 56, and temperature and/or pressure of vapor in the ullage of any fuel tank protected space(s), temperature and pressures in the electrochemical cell 10, and temperature, oxygen content, and/or humidity level of the inert gas. Accordingly, in some embodiments, the system such as shown in FIGS. 3-5 can include sensors for measuring any of the above-mentioned fluid flow rates, temperatures, oxygen levels, humidity levels, or current or voltage levels, as well as controllable output fans or blowers, or controllable fluid flow control valves or gates. These sensors and controllable devices can be operatively connected to a system controller. In some embodiments, the system controller can be dedicated to controlling the fuel tank ullage gas management system, such that it interacts with other onboard system controllers or with a master controller. In some embodiments, data provided by and control of the fuel tank ullage gas management system can come directly from a master controller.

The term "about", if used, is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for providing inert gas to a protected space, comprising
   a pressurized air flow path that receives pressurized air and that is in operative fluid communication with a boost compressor that boosts the pressure of pressurized air in the airflow path and a chemical inert gas generator; and
   an inert gas flow path in operative fluid communication with the chemical inert gas generator, a condenser and the protected space, wherein the condenser operates at a pressure greater than or equal to 2 atmospheres absolute pressure and is located between the chemical inert gas generator and the protected space along the inert gas flow path.

2. The system of claim 1, wherein the chemical inert gas generator comprises a catalytic oxidation unit.

3. The system of claim 2, wherein the catalytic oxidation unit operates at a temperature greater than 150° C.

4. The system of claim 1, wherein the chemical inert gas generator comprises a proton exchange membrane electrochemical device.

5. The system of claim 4, wherein the pressurized air flow path further comprises a heat exchanger.

6. The system of claim 4, wherein the pressurized air flow path comprises a heat exchanger before the boost compressor and an additional heat exchanger after the boost compressor.

7. The system of claim 1, wherein the chemical inert gas generator comprises a solid oxide electrochemical device.

8. The system of claim 7, wherein the chemical inert gas generator operates at a temperature greater than 700° C.

9. The system of claim 7, wherein the inert gas flow path further comprises a heat exchanger between the chemical inert gas generator and the compressor.

10. The system of claim 1, wherein the pressurized air flow path comprises a bypass valve in parallel with the boost compressor.

11. A method for providing inert gas to a protected space comprising
    providing air having a pressure greater than or equal to 2 atmospheres absolute pressure to a chemical inert gas generator;
    producing an inert gas in the chemical inert gas generator;
    providing the inert gas to a condenser at an elevated pressure;
    reducing the water content of the inert gas in the condenser; and
    providing the dried inert gas to a protected space.

12. The method of claim 11, wherein the chemical inert gas generator is a catalytic oxidation unit.

13. The method of claim 12, wherein the chemical inert gas generator operates at a temperature greater than 150° C.

14. The method of claim 11, wherein the chemical inert gas generator comprises a proton exchange membrane electrochemical device.

15. The method of claim 14, wherein the chemical inert gas generator operates at a temperature less than the boiling point of water.

16. The method of claim 11, wherein the chemical inert gas generator comprises a solid oxide electrochemical device.

17. The method of claim 16, wherein the chemical inert gas generator operates at a temperature greater than 700° C.

18. The system of claim 1, wherein the boost compressor is separate from an engine compressor.

* * * * *